United States Patent [19]

Gonas et al.

[11] 4,239,279
[45] Dec. 16, 1980

[54] VEHICLE ROOF COVERING INSTALLATION

[75] Inventors: Albert J. Gonas, Grosse Pointe; Marvin A. Packett, Detroit; Donald A. Street, Royal Oak, all of Mich.

[73] Assignee: General Motors Corporation, Detroit, Mich.

[21] Appl. No.: 936,767

[22] Filed: Aug. 28, 1978

Related U.S. Application Data

[63] Continuation of Ser. No. 792,652, May 2, 1977, abandoned.

[51] Int. Cl.³ ............................................. B62D 25/06
[52] U.S. Cl. .................................................... 296/210
[58] Field of Search ............... 296/136, 137 R, 31 P; 150/52 K; 160/23 R

[56] References Cited

U.S. PATENT DOCUMENTS

| 3,233,937 | 2/1966  | Barenyi       | 296/137    |
| 3,451,716 | 6/1969  | Clare et al.  | 296/137    |
| 3,496,689 | 2/1970  | Nerem         | 296/31 P UX|
| 3,550,950 | 12/1970 | Pollock       | 296/137    |
| 3,926,471 | 12/1975 | Nadasi et al. | 296/137 R  |
| 3,935,353 | 1/1976  | Doerfling     | 296/137 R  |
| 4,029,532 | 6/1977  | Warhol et al. | 296/31 P X |
| 4,154,473 | 5/1979  | Alexander et al. | 296/137 R |

Primary Examiner—John J. Love
Assistant Examiner—Norman L. Stack
Attorney, Agent, or Firm—Charles E. Leahy

[57] ABSTRACT

A roof covering installation includes a pair of side panels having a shape conforming with the sail panels of the vehicle body and a center panel preformed to the contour of the roof panel and adapted to fill the space between the side panels. The side panels and center panel have edge portions which are adapted for mating overlap and are joined together to provide a substrate assembly having a width gauged to the lateral spacing of the sail panels to precisely overlie the roof and sail panels irrespective of dimensional variation in the width of the vehicle body. The roof covering is adhesively secured to the substrate assembly in an off-line assembly, after which the substrate assembly is mounted and secured on the vehicle. The side panels have window openings which register with the window openings of the sail panels and have integrally formed abutment structures which extend around the periphery of the window opening for attachment to the sail panel and which also define a flange structure for receiving a window panel support channel. The edge portions of the substrate assembly may extend beyond the window opening and onto the window panel to change the size of the window.

5 Claims, 11 Drawing Figures

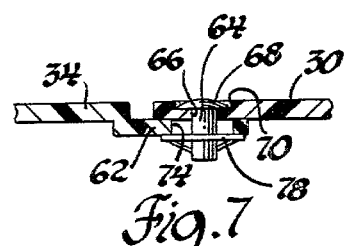
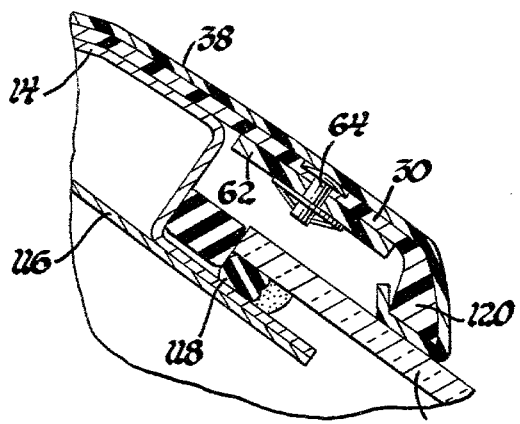
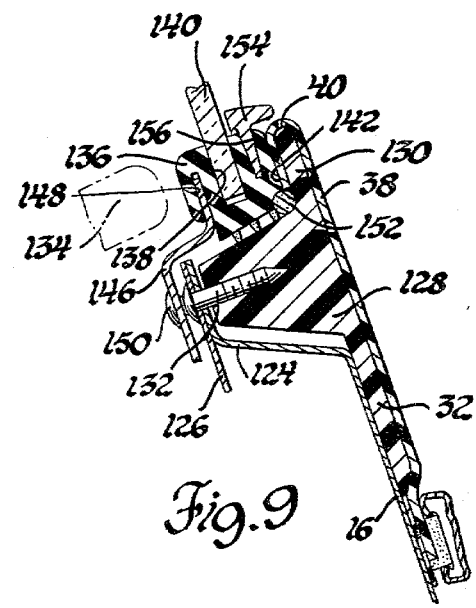
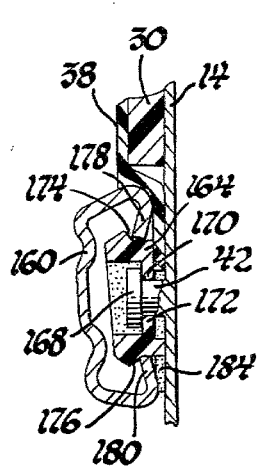
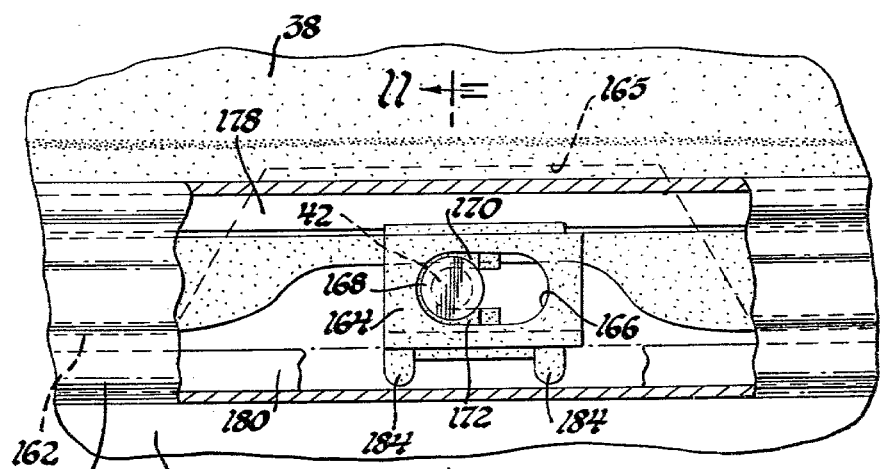

VEHICLE ROOF COVERING INSTALLATION

This is a continuation of application Ser. No 792,652, filed on May 2, 1977, now abandoned.

The invention relates to a vinyl roof covering for a vehicle body and more particularly provides a rigid substrate assembly upon which a flexible vinyl roof covering is secured.

The use of a flexible vinyl roof covering for a vehicle body roof is well known. The installation of such a roof covering is conventionally comprised of adhesively securing a preformed vinyl sheet material directly on the roof panel and sail panels of the vehicle body. The roof covering can be made to precisely fit the roof irrespective of manufacturing dimensional variation by stretching the roof covering over the roof panel and sail panels and then trimming away any excess material at the edges. A reveal molding is then applied around the edge of the roof covering and at the window openings to provide a finished appearance and provide additional retention of the roof covering edges to the body panels.

One disadvantage of the aforedescribed conventional vinyl roof covering installation is that the securement of the flexible vinyl roof covering to the body panels is relatively time consuming and can result in a work flow imbalance which is undesirable in modern assembly line operations.

According to the present invention, a roof covering installation includes a pair of side panels having a shape conforming with the sail panels of the vehicle body and a center panel preformed to the contour of the roof panel and adapted to fill the space between the side panels. The side panels and center panel have edge portions which are adapted for mating overlap and are joined together to provide a substrate assembly having a width gauged to the lateral spacing of the sail panels to precisely overlie the roof and sail panels irrespective of dimensional variation in the width of the vehicle body. The roof covering is adhesively secured to the substrate assembly in an off-line assembly, after which the substrate assembly is mounted and secured on the vehicle body. The side panels have window openings which register with the window openings of the sail panels and have integrally formed abutment structures which extend around the periphery of the window opening for attachment to the sail panel and which also define a flange structure for receiving a window panel support channel. The edges of the vinyl roof covering are reversely folded over the edge portions of the substrate assembly at the window openings so that a garnish molding need not be employed to conceal the edges of the roof covering. The edge portions of the substrate assembly may extend beyond the edge of the window opening to reduce the viewing area of the window.

One object, feature and advantage is the provision of a rigid substrate assembly to which a vinyl roof covering is adhesively secured prior to securement of the substrate assembly on a vehicle body roof.

Another object, feature and advantage of the invention is the provision of a rigid preformed substrate assembly for a vinyl roof covering and comprised of a plurality of substrate panels having edge portions adapted for mating overlap and joined together at an adjusted width to precisely overlie the sail panels and roof panels of the vehicle body.

Another object, feature and advantage of the invention is the provision of a plastic substrate assembly having edge portions which may extend onto the window panel to reduce the window viewing area and thereby modify the appearance of the vehicle body.

These and other objects, features and advantages of the invention will become apparent upon consideration of the specification and the appended drawings in which:

FIG. 6 is a sectional view taken in the direction of arrows 6—6 of FIG. 5;

FIG. 7 is a sectional view taken in the direction of arrows 7—7 of FIG. 5;

FIG. 8 is a sectional view taken at the upper edge of the rear window;

FIG. 9 is a sectional view of the invention taken through one of the sail panel windows;

FIG. 10 is a plan view having parts broken away and in section showing the attachment of a reveal molding around the edge portions of the vinyl roof installation; and FIG. 11 is a sectional view taken in the direction of arrows 11—11 of FIG. 10.

Figures 1, 2:
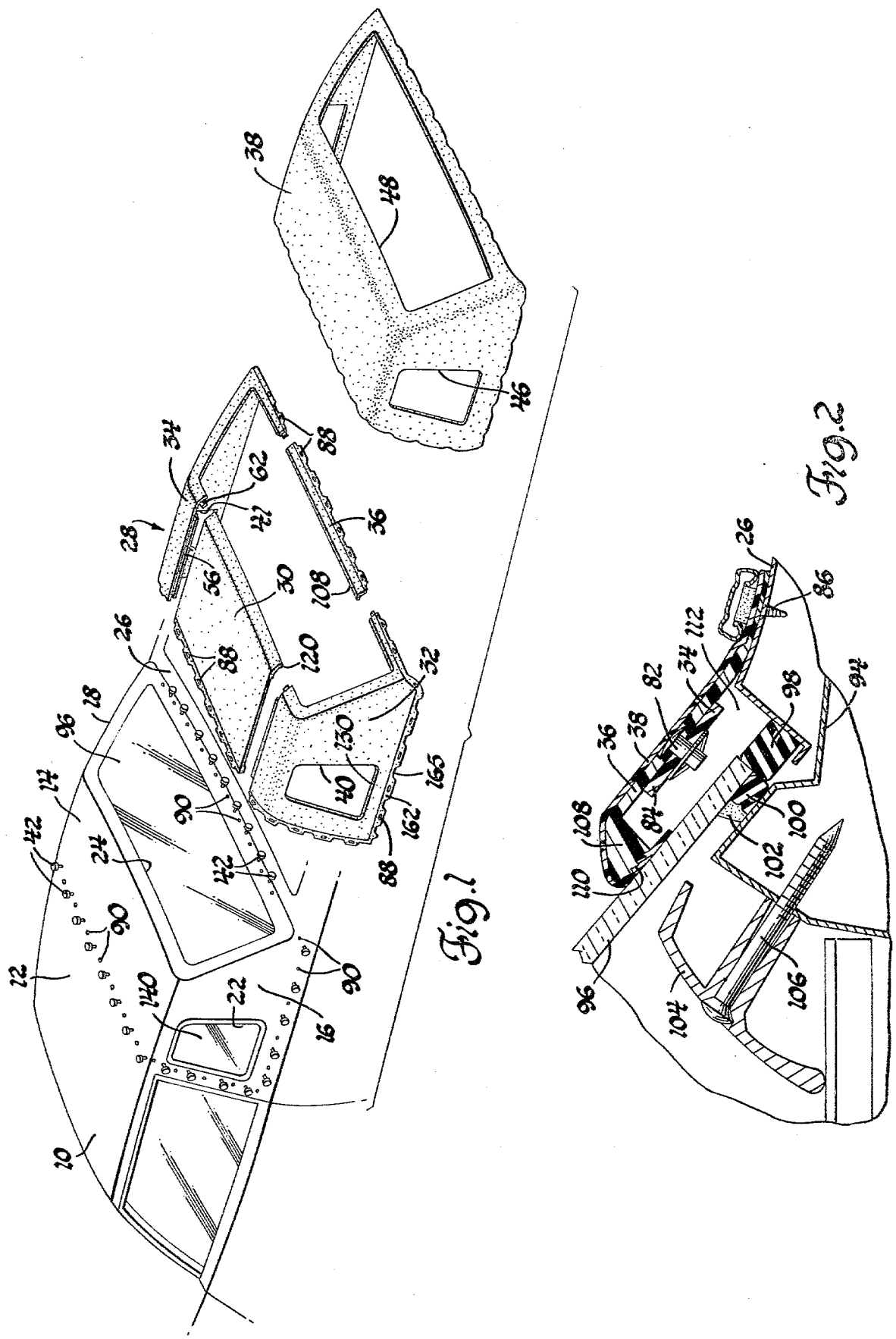
FIG. 1 is an exploded perspective view of a roof covering installation according to the invention.
FIG. 2 is a cross-sectional view of the invention taken at the lower edge of the rear window.

Referring to FIG. 1, there is shown a vehicle body 10 having a roof structure 12 including a roof panel 14 and left and right sail panels 16 and 18. Sail panel 16 has a window opening 22. A like window opening, not shown, is provided in the sail panel 18. A rear window opening 24 is defined by edge portions of the roof panel 14, sail panels 16 and 18, and a laterally extending filler panel 26.

FIG. 1 also shows an exploded view of a vinyl roof substrate assembly generally indicated at 28, including a center panel 30, left and right side panels 32 and 34, and a filler panel 36. Each of the substrate panels 30, 32, 34, and 36 are vacuum formed or injection molded of any one of a number of commercially available plastic or equivalent materials. The substrate panels 30, 32, 34, and 36 are joined together as will be described hereinafter to provide the substrate assembly 28 onto which a preformed vinyl roof covering 38 is adhesively secured.

The substrate side panel 32 has a window opening 40 provided therein which registers with the window opening 22 of sail panel 16 when the substrate side panel is overlaid on the sail panel 16. The side panel 34 has a like window opening 41. A plurality of headed studs 42 are welded onto the vehicle body for attachment thereto of a reveal molding as will be described hereinafter.

Figure 3:
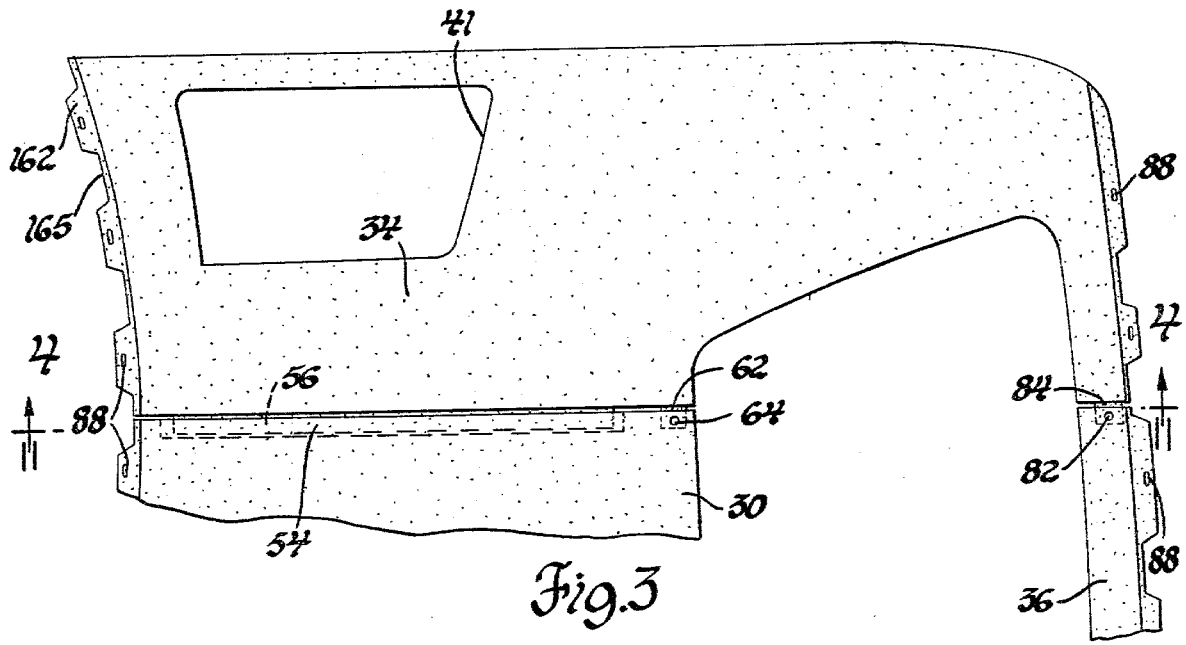
FIG. 3 is a plan view of the substrate assembly of the invention.

Referring to FIGS. 3 and 6, it is seen that the center panel 30 and the side panel 34 have respective lateral lips 54 and 56 extending along their adjacent edge portions and adapted for mating overlap, as best seen in the sectional view of FIG. 6.

Figure 5:
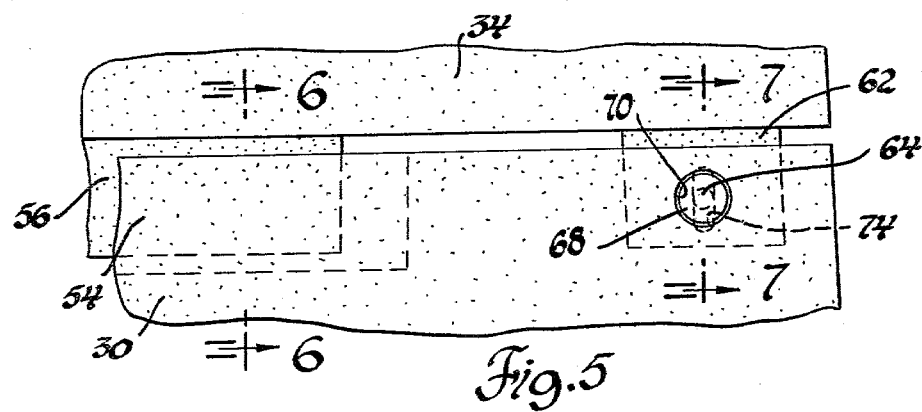
FIG. 5 is an enlarged fragmentary view of FIG. 3.

Furthermore, as seen in FIGS. 5 and 7, the side panel 34 has an offset flange portion 62 which underlies the edge of center panel 30. A fastening pin 64 extends through a hole 66 in the center panel 30 and has a head 68 which seats in a counterbore 70. The fastening pin 64 also extends through a laterally extending slot 74 in the offset flange portion 62 of side panel 34. The laterally extending slot 74 permits adjustment of the panels relative one another so that the respective panels will precisely overlie the sail panels and roof panel of the vehicle body when joined together. A push-on fastener 78 is engaged over the fastening pin 64 to cooperate with the pin in attaching the panels 30 and 34 in their properly adjusted positional relationship.

Referring to FIG. 3, it is seen that the side panel 34 and the filler panel 36 are joined together at their adjacent edge portions by a fastening pin 82 which acts between a laterally extending offset flange portion 84 of the side panel 34 and the filler panel 36.

It is to be understood that the lateral spacing of the vehicle body at the sail panels 16 and 18 may vary by about ±3/16 of an inch. The width of the vehicle body at the sail panels is gauged and then the substrate panels are joined together to provide a width which is precisely gauged to overlie the sail panels of the vehicle body. In addition to the fastening pins 64 and 82 it is desirable to adhesively secure the overlapping lips 54 and 56 by a bead of adhesive or a two-sided tape.

Subsequent to the joining of the substrate panels 30, 32, 34, and 36 as aforedescribed, the flexible sheet vinyl roof covering 38 is adhesively secured on the surfaces of the substrate assembly 28. The edge portions of the vinyl cover at the side window openings 46 and rear window opening 48 are folded over the edge portions of the panels and adhesively secured to the inner surfaces thereof.

Figure 4:
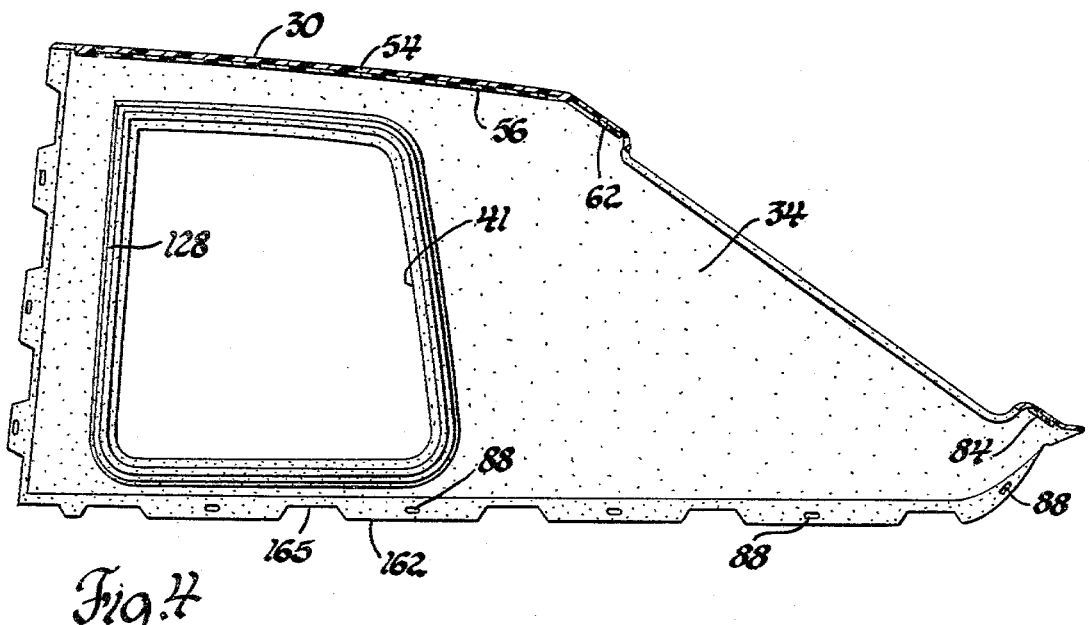
FIG. 4 is a sectional view taken in the direction of arrows 4—4 of FIG. 3.

The substrate assembly with the vinyl covering secured thereto is then fitted over the vehicle body and attached thereto by a plurality of screws 86, one of which is shown in FIG. 2. As seen in FIGS. 1, 3 and 4, screw holes 88 are provided at spaced intervals along the edges of the respective substrate panels, while mating holes 90 are provided in the various vehicle body panels.

Referring to FIG. 2, there is shown a typical section at the lower edge of the rear window. A body panel 94 and the filler panel 26 cooperate to mount the rear window glass 96. The edge of the rear window 96 seats against a resilient bumper 98. A bead of butyl rubber or similar adhesive 100 acts between the inside face of the window glass 96 and the body panel 94 to adhesively secure the window glass 96. A resilient dam 102 prevents the adhesive bead 100 from flowing toward the interior of the vehicle body. A garnish molding 104 is attached to the body panel 94 by a screw 106 to provide a decorative appearance. As seen in FIG. 2, the filler panel 36 has an abutment 108 over which the roof covering 38 is folded and adhesively secured. The abutment 108 may have teeth 110 which grip the roof covering 38 to provide additional retention. A reveal molding is not necessary around the edge of the window opening as the reverse folding of the vinyl roof covering 38 provides an aesthetically pleasing appearance. Filler panel 36 of the substrate assembly defines a space 112 which accommodates the offset flange portion 84 of side panel 34 and the fastening pin 82.

Referring now to FIG. 8, it is seen that the vehicle roof structure includes the roof panel 14 and an inner reinforcing panel 116. The rear window glass 96 is adhesively secured to a flange of the roof panel 14 by a bead of adhesive 118. The center panel 30 has an abutment lip 120 over which the vinyl roof covering 38 is folded and adhesively secured. Both of the side panels have similar abutment lips around the rear window openings. As seen in FIGS. 2 and 8, the effective viewing area of the rear window is modified by the extent to which the abutment lips of the center panel 30, side panels 32 and 34 and the filler panel 36 overlie the rear window glass 96. The appearance of the vehicle body may be altered by varying the extent of encroachment of the substrate assembly onto the window glass.

Referring to FIG. 9, there is shown the construction of the sail panels 16 and 18 at the side window opening. The sail panel 16 has an inwardly offset flange 124 having a reinforcement panel 126 attached thereto as by welding. The side panel 32 has an inwardly extending abutment structure 128 which extends within the flange 124 of the sail panel 16 continuously about the window opening. A plurality of screws 132 extend between the sail panel flange 124 and the abutment structure 128. The roof covering 38 is folded over an edge lip 130 of the side panel 32 at the window opening 40 thereof. A resilient window channel 136 has a slot 138 which receives the side window glass 140. The window channel 136 is seated in an inwardly facing flange structure 142 formed by the side panel 32 and the abutment 128. A retaining ring 146 is received in a groove 148 of the window channel 136 and is attached to the sail panel flange 124 by a plurality of screws 150 to retain the window channel 136 in engagement of the inwardly facing flange structure 142 of the side panel 32. A sealing strip 152 is preferably provided at the interface between the window channel 136 and side panel 32 to seal against water leaks. An optional reveal molding 154 may be seated in a groove 156 of the window channel 136.

The viewing area of the side window may be reduced by having the edge lip 130 of side panel 32 extend further beyond the window opening defined by sail panel 16 so that a portion of the window panel 140 is overlaid by the roof covering installation to alter the appearance of the vehicle body. The phantom-line indicated interior trim 134 is positioned to align generally with the size of the window opening 40 of the substrate assembly.

Referring to FIGS. 10 and 11, there is shown a reveal molding 160 which is provided around the edges of the roof covering installation. Referring again to FIG. 1, it is seen that the substrate panels each have an edge configuration of reduced thickness and having alternating tabs 162 and notches 165. Each of the tabs 162 has a screw hole 88 for attachment of the substrate assembly to the vehicle body. The notches 165 provide clearance for the headed studs 42 which are welded to the vehicle body panels. A molding attachment clip 164 has an opening 166 by which the clip 164 is lowered over the head 168 of stud 42. The clip 164 is then moved in the rightward direction to its position of FIGS. 10 and 11 wherein shoulders 170 and 172 are engaged under the head 168 to attach the clip 164 to the vehicle body. The clip has cam faces 174 and 176 which retain inwardly bent legs 178 and 180 of the reveal molding 160. Molding clip 164 has feet 184 which space the molding 160 from the vehicle body panel to prevent corrosion. The molding 160 conceals the edge portions of the substrate assembly 28 and roof covering to provide an aesthetic appearance as well as providing an additional attachment of the substrate assembly 28 to the vehicle body.

Thus it is seen that the invention provides a new and improved roof covering installation for a vehicle body.

The embodiments of the invention in which an exclusive property or privilege is claimed are defined as follows:

1. Method of installing a flexible sheet roof covering on a vehicle body having a roof structure including a roof panel and laterally spaced sail panels, comprising the steps of:

preforming a first substrate panel to a shape conforming to one of the sail panels and a portion of the roof panel and a second substrate panel to a shape conforming to the other sail panel and a portion of the roof panel, said first and second substrate panels having edge portions adapted for mating overlap by which the first and second substrate panels may be joined together to provide a substrate panel assembly having an extent substantially equal to the extent of the flexible sheet roof covering;

gauging the width of the lateral spacing of the sail panels of a selected vehicle body;

joining the edge portions of the first and second substrate panels to provide a substrate assembly having a width gauged to the lateral spacing of the sail panels of the selected vehicle body to provide an assembled substrate sized to precisely overlie the roof and sail panels of the selected vehicle body;

adhesively securing the flexible sheet roof covering on the substrate assembly;

and mounting and securing the substrate assembly on the vehicle body.

2. A flexible sheet roof covering installation for a vehicle body having a roof structure including a roof panel and laterally spaced sail panels and comprising:

a plurality of separate substrate panels each having an extent less than the extent of the flexible sheet roof covering, said plurality of substrate panels including at least a first substrate panel having a shape conforming to one of the sail panels and a portion of the roof panel, and a second substrate panel having a shape conforming to the other sail panel and a portion of the roof panel, said substrate panels having edge portions adapted for adjustable mating overlap to conform to the lateral spacing between the sail panels;

fastening means acting between the overlapping edge portions to attach the substrate panels and thereby form a substrate panel assembly having an extent substantially equal to the extent of the flexible sheet roof covering and adapted to precisely overlie the roof and sail panels of the vehicle body;

said flexible sheet roof covering being adhesively secured on the panel assembly;

and means attaching the panel assembly on the vehicle body.

3. A flexible sheet roof covering installation for a vehicle body having a roof structure including a roof panel and laterally spaced sail panels having window openings therein and comprising:

a plurality of at least two separate substrate panels, each panel having a shape conforming to overlie only one of the sail panels and a portion of the roof panel, said substrate panels having edge portions adapted for adjustable mating overlap to conform to the lateral spacing between the sail panels;

said substrate panels having window openings therein registering with the window openings of the sail panels and an integrally formed abutment structure extending around the periphery of the window opening for attachment to the sail panel and defining a flange structure opening inwardly of the window opening for receiving a supporting channel for a window panel;

fastening means acting between the overlapping edge portions to attach the substrate panels and thereby form a substrate panel roof assembly adapted to precisely overlie the roof and sail panels of the vehicle body;

a flexible sheet roof covering adhesively secured on the panel assembly;

and means attaching the panel assembly on the vehicle body roof structure.

4. A flexible sheet roof covering installation for a vehicle body having a roof panel and laterally spaced sail panels and comprising:

a pair of plastic side panels, each side panel having a shape formed to overlie only one of the sail panels and extend along the roof panel toward but short of the opposite side panel to leave a space therebetween;

a center panel formed to the contour of the roof panel and adapted to fill the space between the side panels;

the side panels and center panel having edge portions adapted for mating overlap;

fastening means acting between the overlapping edge portions to attach the side panels and center panel, thereby forming a panel assembly adapted to overlie the roof and sail panels of the vehicle body;

a flexible sheet roof covering adhesively secured on the panel assembly;

and means attaching the panel assembly with the roof covering secured thereto on the vehicle body.

5. A flexible sheet roof covering installation for a vehicle body having a roof structure defining window openings having window glass mounted therein and comprising:

a plurality of at least two separate substrate panels, said substrate panels each having an extent less than the extent of the flexible sheet roof covering and including at least a first substrate panel having a shape conforming to one of the sail panels and a portion of the roof panel and a second substrate panel having a shape conforming to the other sail panel and a portion of the roof panel, said plurality of substrate panels having edge portions adapted for adjustable mating overlap to conform to the size of the roof structure, fastening means acting between the overlapping edge portions to attach the substrate panels and thereby form a panel assembly having an extent substantially equal to the extent of the flexible sheet roof covering and adapted to overlie the roof structure of the vehicle body;

said substrate panels having edge portions defining window openings therein registering with the window openings of the roof structure and extending into overlying engagement of a portion of the window glass to reduce the window viewing area;

said flexible sheet roof covering being adhesively secured on the panel assembly;

and means attaching the panel assembly on the vehicle body roof structure.

* * * * *